No. 850,665. PATENTED APR. 16, 1907.
H. E. MARSCH.
NUT LOCK.
APPLICATION FILED SEPT. 29, 1906.

Inventor
Howard E. Marsch
By Victor J. Evans
Attorney

Witnesses

UNITED STATES PATENT OFFICE.

HOWARD E. MARSCH, OF CATASAUQUA, PENNSYLVANIA.

NUT-LOCK.

No. 850,665.　　　Specification of Letters Patent.　　　Patented April 16, 1907.

Application filed September 29, 1906. Serial No. 336,716.

*To all whom it may concern:*

Be it known that I, HOWARD E. MARSCH, a citizen of the United States of America, residing at Catasauqua, in the county of Lehigh and State of Pennsylvania, have invented new and useful Improvements in Nut-Locks, of which the following is a specification.

This invention relates to nut-locks; and the object of the same is to provide simple means for locking a nut to a bolt and the object through which the bolt is passed and to provide means whereby the nut may be readily readjusted upon the bolt and locked in said readjusted position. This and other objects may be attained by means of the construction illustrated in the accompanying drawings, in which—

Figure 1:
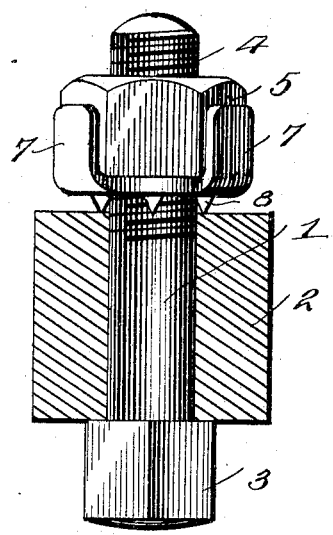
Figure 2:
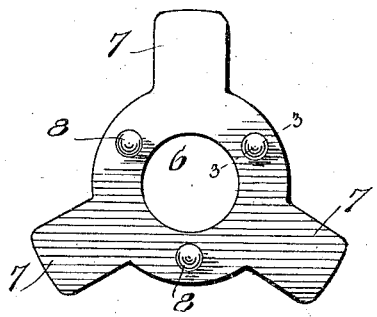
Figure 3:
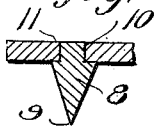

Figure 1 is a side elevation of a bolt and nut held in adjusted position upon a piece of metal or other material by means of my nut-lock. Fig. 2 is an under side plan view of my nut-lock before the radial wings or lugs have been bent up against the sides of the nut. Fig. 3 is a detail section on the line 3 3. Fig. 2.

Referring to the drawings for a more particular description of my invention, the numeral 1 designates a bolt of ordinary construction, and 2 is a piece of metal or other material through which the bolt 1 is passed, the head 3 of said bolt bearing against one side of the object 2 and the opposite end of said bolt being threaded in the usual manner, as at 4, for an ordinary nut 5.

My nut-lock consists of a washer, preferably made of malleable sheet-iron and having a central bolt-aperture 6 and a series of radial arms 7. Fitted in apertures surrounding the bolt-hole 6 are the locking-pins 8, said pins being formed of hardened steel and provided with a penetrating point 9 and a shouldered shank 10, said shank being fitted into openings 11 in the washer with the upper surface of said shank lying flush with the upper surface of the washer, as shown in Fig. 3. It is to be noted that the shanks 10 of the locking-pins 8 are merely seated within the perforations 11 of the washer and are held therein by friction only.

The operation of my nut-lock may be briefly described as follows: The bolt 1 having been passed through the object 2, the nut-lock is placed upon the bolt with the arms 7 lying flat in the plane with the washer and the locking-pins being disposed against the surface of the object 2. The nut 5 is then turned upon the threaded portion 4 of the bolt until the penetrating points 9 are embedded within the surface of the object 2, and the radial arms 7 are then bent upward against the sides of the nut 5, thus holding the nut firmly in place against the object 2 and preventing it from turning upon the bolt 4. Whenever it is found necessary to readjust the nut 5 upon the bolt, the arms 7 may be bent downward and the nut readjusted, after which the arms may again be bent up against the sides of the nut.

From the foregoing it will be obvious that a nut-lock made in accordance with my invention is of simple construction, can be produced at slight cost, will firmly secure a nut to a bolt, and permit the nut to be readjusted whenever desired.

Having thus described the invention, what I claim is—

A nut-lock comprising a washer provided with radial arms and a series of steel locking-pins fitted in apertures in said washer, said locking-pins each provided with a shank, the upper surface of which is flush with the upper surface of the washer, substantially as described.

In testimony whereof I affix my signature in presence of two witnesses.

HOWARD E. MARSCH.

Witnesses:
　WILLIAM WATKINS,
　REUBEN OTT.